United States Patent
Kao et al.

(10) Patent No.: US 8,000,100 B2
(45) Date of Patent: Aug. 16, 2011

(54) HEAT DISSIPATING MODULE CAPABLE OF ADJUSTING A VENT AND RELATED COMPUTER SYSTEM

(75) Inventors: Chin-Shan Kao, Taipei County (TW); Chih-Tsung Chu, Taipei County (TW)

(73) Assignee: Micro-Star Int'l Co., Ltd., Zhonghe Dist, New Taipei (TW)

( * ) Notice: Subject to any disclaimer, the term of this patent is extended or adjusted under 35 U.S.C. 154(b) by 0 days.

(21) Appl. No.: 12/721,547

(22) Filed: Mar. 10, 2010

(65) Prior Publication Data
US 2011/0103007 A1    May 5, 2011

(30) Foreign Application Priority Data
Nov. 2, 2009   (TW) .............................. 98220230 U

(51) Int. Cl.
*H05K 7/20* (2006.01)
(52) U.S. Cl. ... 361/695; 361/690; 361/694; 165/104.33; 454/184; 454/256
(58) Field of Classification Search .................. None
See application file for complete search history.

(56) References Cited

U.S. PATENT DOCUMENTS

| | | | |
|---|---|---|---|
| 6,694,759 B1 * | 2/2004 | Bash et al. | 62/180 |
| 6,981,915 B2 * | 1/2006 | Moore et al. | 454/184 |
| 7,316,606 B2 * | 1/2008 | Shipley et al. | 454/184 |
| 7,347,058 B2 * | 3/2008 | Malone et al. | 62/259.2 |
| 7,656,664 B2 * | 2/2010 | Ye et al. | 361/695 |
| 7,688,593 B2 * | 3/2010 | Byers et al. | 361/721 |
| 7,852,628 B2 * | 12/2010 | Hirohata et al. | 361/695 |
| 2005/0168942 A1 * | 8/2005 | Steinbrecher | 361/690 |
| 2008/0218969 A1 * | 9/2008 | Muraki | 361/695 |
| 2009/0016019 A1 * | 1/2009 | Bandholz et al. | 361/695 |
| 2009/0299531 A1 * | 12/2009 | Kitamura et al. | 700/275 |
| 2010/0311317 A1 * | 12/2010 | McReynolds et al. | 454/256 |

* cited by examiner

*Primary Examiner* — Boris Chervinsky
(74) *Attorney, Agent, or Firm* — Winston Hsu; Scott Margo

(57) ABSTRACT

A heat dissipating module includes a detecting component and a ventilation device. The ventilation device includes a housing whereon an opening is formed, at least one vane covering on the opening in a movable manner, and a driving unit electrically connected to the vane for driving the vane to move relative to the opening so as to adjust an aperture between the vane and the opening. The heat dissipating module further includes a fan for inhaling or exhaling airflow through the opening of the ventilation device, and a control unit electrically connected to the detecting component, the ventilation device, and the fan for controlling the driving unit to drive the fan to move relative to the opening according to a detecting result of the detecting component.

17 Claims, 5 Drawing Sheets

HEAT DISSIPATING MODULE CAPABLE OF ADJUSTING A VENT AND RELATED COMPUTER SYSTEM

BACKGROUND OF THE INVENTION

1. Field of the Invention

The present invention relates to a heat dissipating module, and more particularly, to a heat dissipating module capable of adjusting a vent and a related computer system.

2. Description of the Prior Art

With the advanced technology, heat dissipating efficiency is an important issue in an application of a conventional heat dissipating system. Various heat dissipating mechanisms are designed to dissipate huge heat generated by a heat source with high power for keeping an electronic device in a normal working temperature. However, a conventional air cooling system with a fan still has unsolved problems. The electronic device with the conventional air cooling system always increases the fans and the heat sink for improving the heat dissipating efficiency, which not only raises cost of the electronic device but also increases noise and danger that a user may be heated by the heat sink with high temperature easily. In addition, large numbers of the fans and the heat sink can not dissipate the heat out of the electronic device effectively. The conventional heat dissipating mechanism further forms holes on a housing of the electronic device for dissipating the heat. However, this structural design detracts artistic appearance of the housing. Thus, design of a heat dissipating device capable of utilizing the conventional fan to increase the heat dissipating efficiency is an important issue in the mechanical industry.

SUMMARY OF THE INVENTION

The present invention provides a heat dissipating module capable of adjusting a vent and a related computer system for solving above drawbacks.

According to the claimed invention, a heat dissipating module includes a detecting component and a ventilation device. The ventilation device includes a housing whereon an opening is formed, at least one vane covering on the opening in a movable manner, and a driving unit electrically connected to the vane for driving the vane to move relative to the opening so as to adjust an aperture between the vane and the opening. The heat dissipating module further includes a fan for inhaling or exhaling airflow through the opening of the ventilation device, and a control unit electrically connected to the detecting component, the ventilation device, and the fan for controlling the driving unit to drive the vane to move relative to the opening and controlling a rotary speed of the fan according to a detecting result of the detecting component.

According to the claimed invention, a computer system includes a casing, an electronic component disposed inside the casing, an input module for inputting a command, and a heat dissipating module disposed on the casing for dissipating heat generated by the electronic component. The heat dissipating module includes a detecting component and a ventilation device. The ventilation device includes a housing whereon an opening is formed, at least one vane covering on the opening in a movable manner, and a driving unit electrically connected to the vane for driving the vane to move relative to the opening so as to adjust an aperture between the vane and the opening. The heat dissipating module further includes a fan for inhaling or exhaling airflow through the opening of the ventilation device, and a control unit electrically connected to the input module, the detecting component, the ventilation device, and the fan for controlling the driving unit to drive the vane to move relative to the opening according to the command from the input module or a detecting result of the detecting component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
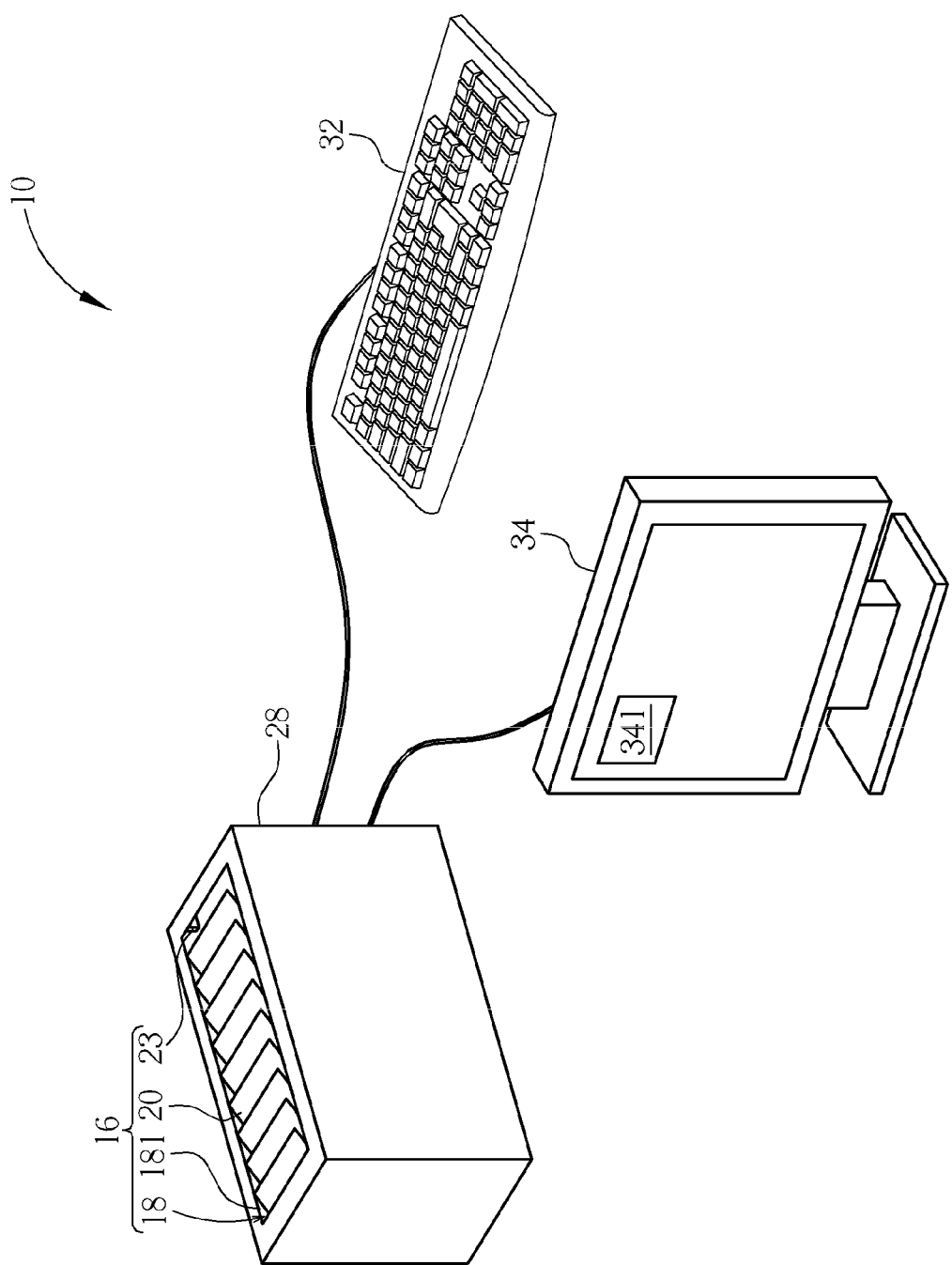
FIG. 1 is a schematic diagram of a computer system according to a preferred embodiment of the present invention.
Figure 2:
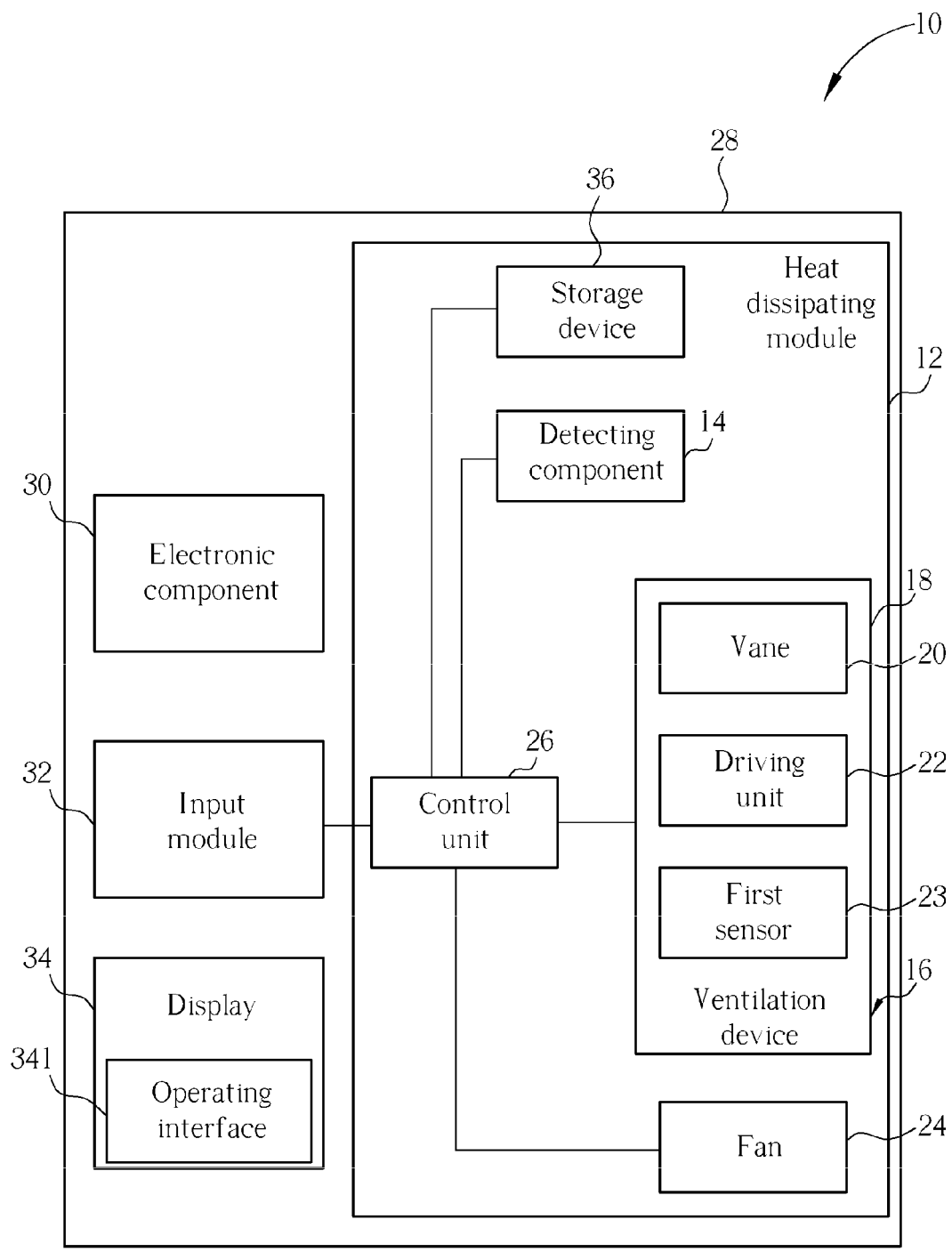
FIG. 2 is a functional block diagram of the computer system according to the preferred embodiment of the present invention.

Please refer to FIG. 1 and FIG. 2. FIG. 1 is a schematic diagram of a computer system 10 according to a preferred embodiment of the present invention. FIG. 2 is a functional block diagram of the computer system 10 according to the preferred embodiment of the present invention. The computer system 10 includes a heat dissipating module 12 for dissipating heat generated by internal elements. The heat dissipating module 12 includes a detecting component 14 and a ventilation device 16. The detecting component 14 can be a timer, a temperature sensor for detecting internal temperature of the computer system 10, a detecting program for detecting whether an application program is started, and so on. That is to say, the detecting component 14 can be hardware, firmware, or software. The ventilation device 16 includes a housing 18 whereon an opening 181 is formed. The opening 181 can be an inhaling hole or an exhaling hole. Function of the opening 181 depends on design demand. The ventilation device 16 further includes at least one vane 20 covering on the opening 181 in a movable manner. The ventilation device 16 further includes a driving unit 22 electrically connected to the vane 20 for driving the vane 20 to move relative to the opening 181 so as to enlarge or reduce an aperture between the vane 20 and the opening 181. The ventilation device 16 can further include a first positioning sensor 23 disposed on a side of the vane 20 for sensing a position of the vane 20 so as to get the aperture between the vane 20 and the opening 181. The first positioning sensor 23 can be an optical sensor for sensing the position of the vane 20 with a beam. The heat dissipating module 12 further includes a fan 24 for inhaling or exhaling airflow passing through the opening 181 of the ventilation device 16. The heat dissipating module 12 further includes a control unit 26 electrically connected to the detecting component 14, the ventilation device 16, and the fan 24 for controlling the driving unit 22 to drive the vane 20 to move relative to the opening 181 according to a detecting result of the detecting component 14.

Figure 3:
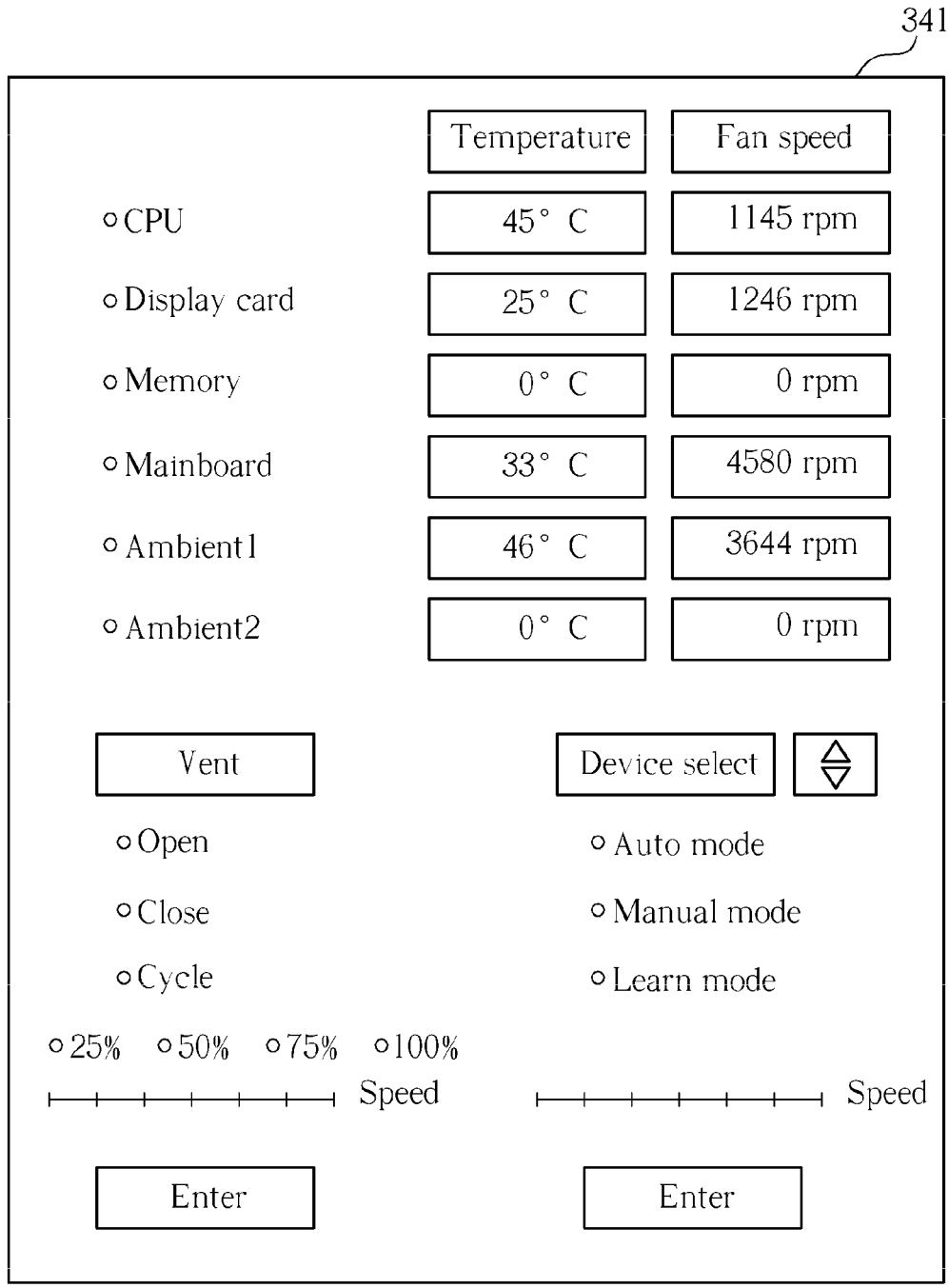
FIG. 3 is a diagram of an operating interface according to the preferred embodiment of the present invention.

The computer system 10 includes a casing 28 for covering the internal elements with the housing 18. The heat dissipating module 12 is disposed on the casing 28. The computer system 10 further includes an electronic component 30 disposed inside the casing 28. The electronic component 30 is a heat source, such as a central processing unit, a memory, a main board, and so on. The heat dissipating module 12 is for dissipating heat generated by the electronic component 30. The computer system 10 further includes an input module 32 electrically connected to the control unit 26 of the heat dissipating module 12 for inputting a command so as to control operation of the heat dissipating module 12. For example, the input module 32 can input the command to control the control unit 26 of the heat dissipating module 12 to control the driving unit 22 to drive the vane 20 to move relative to the opening 181 and to control a rotary speed of the fan 24 according to the command inputted by the input module 32 or the detecting result from the detecting component 14. In addition, the computer system 10 can further include a display 34 electrically connected to the control unit 26 of the heat dissipating module 12 for displaying an operating interface 341 corresponding to the command of the input module 32 or corresponding to the detecting result of the detecting component 14. Please refer to FIG. 3. FIG. 3 is a diagram of the operating interface 341 according to the preferred embodiment of the present invention. The operating interface 341 can display the detecting result of the detecting component 14, such as the temperature of the electronic component 30, the rotary speed of the fan 24, the aperture between the vane 20 and the opening 181 of the ventilation device 16, the command inputted by the input module 32, and so on. Information displayed on the operating interface 341 is not limited to the above-mentioned embodiment and depends on actual demand.

The heat dissipating module 12 can further include a storage device 36 electrically connected to the control unit 26 for storing a correlation between the detecting result of the detecting component 14 and a movement of the vane 20 driven by the driving unit 22, a correlation between time and the movement of the vane 20 driven by the driving unit 22, a correlation between the time, the movement of the vane 20 driven by the driving unit 22, and the rotary speed of the fan 24, and so on, so that the input module 32 inputs the command to control the control unit 26 to control the driving unit 22 to drive the vane 20 to move relative to the opening 181 according to the correlations.

Figure 4:
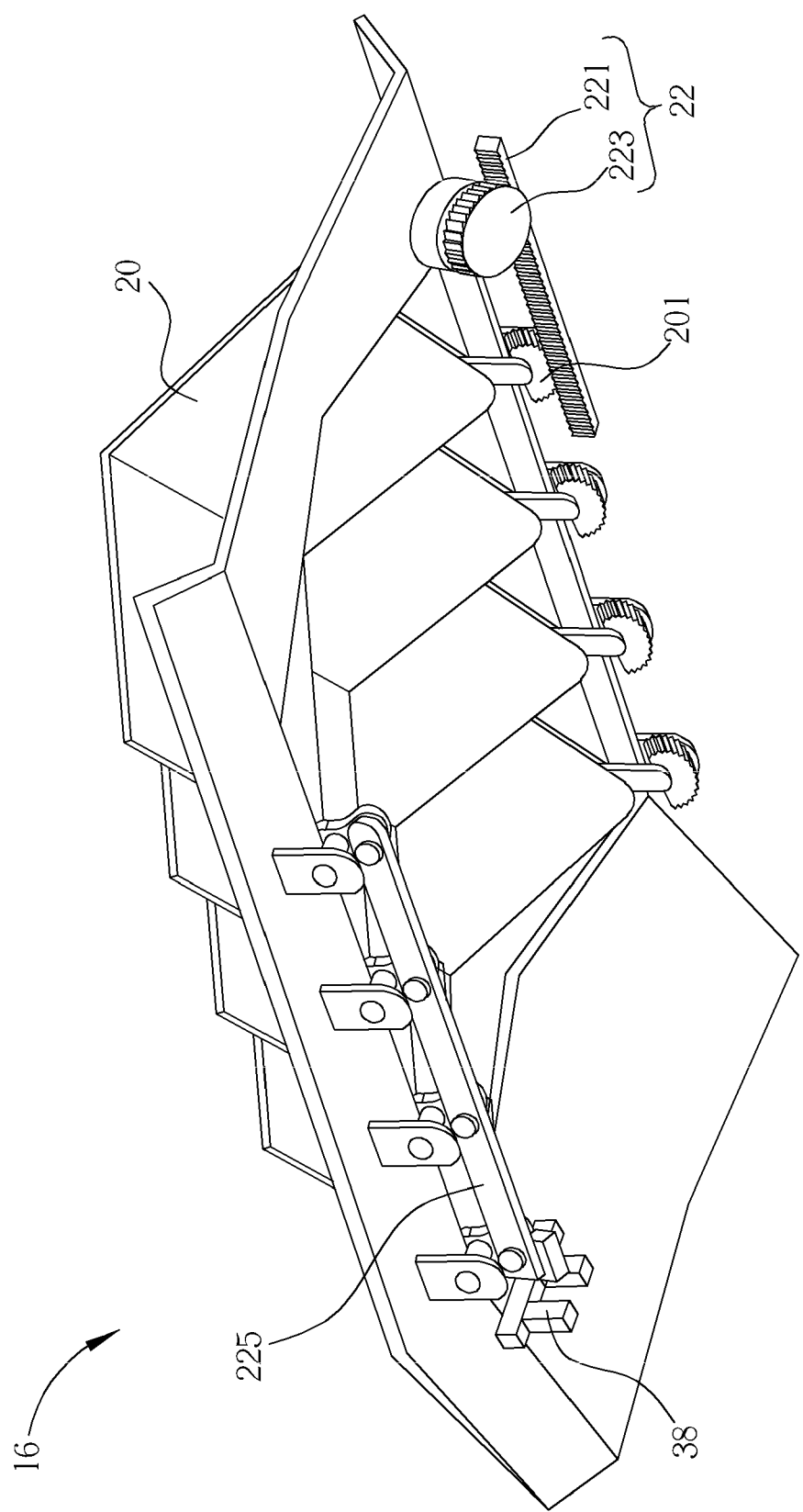
FIG. 4 is a diagram of a ventilation device according to a first embodiment of the present invention.

Please refer to FIG. 4. FIG. 4 is a diagram of the ventilation device 16 according to a first embodiment of the present invention. The ventilation device 16 is a blind type ventilation device, and the vane 20 is a blade of the blinds. The driving unit 22 of the ventilation device 16 includes a rack 221 engaged with a gear 201 disposed on the vane 20. The driving unit 22 further includes a stepping motor 223 for driving the rack 221 to drive the vane 20 to move relative to the opening 181, so as to enlarge or reduce the aperture between the vane 20 and the opening 181. The ventilation device 16 can include a plurality of vanes 20, and the driving unit 22 can further include a link 225 connected to the plurality of vanes 20, so that the plurality of vanes 20 can be moved relative to the opening 181 simultaneously when one of the vanes 20 is driven by the rack 221. In addition, the ventilation device 16 can further include a second positioning sensor 38 disposed on an end of the link 225 for sensing a position of the link 225, so as to get the aperture between the vane 20 and the opening 181. The second positioning sensor 38 can be the optical sensor for detecting the position of the link 225 with a beam. The first positioning sensor 23 and the second positioning sensor 38 can be for sensing the positions of the vane 20 and the link 225, respectively, so as to get the aperture between the vane 20 and the opening 181. The first positioning sensor 23 and the second positioning sensor 38 can be disposed alternatively for sensing the aperture between the vane 20 and the opening 181.

Figure 5:
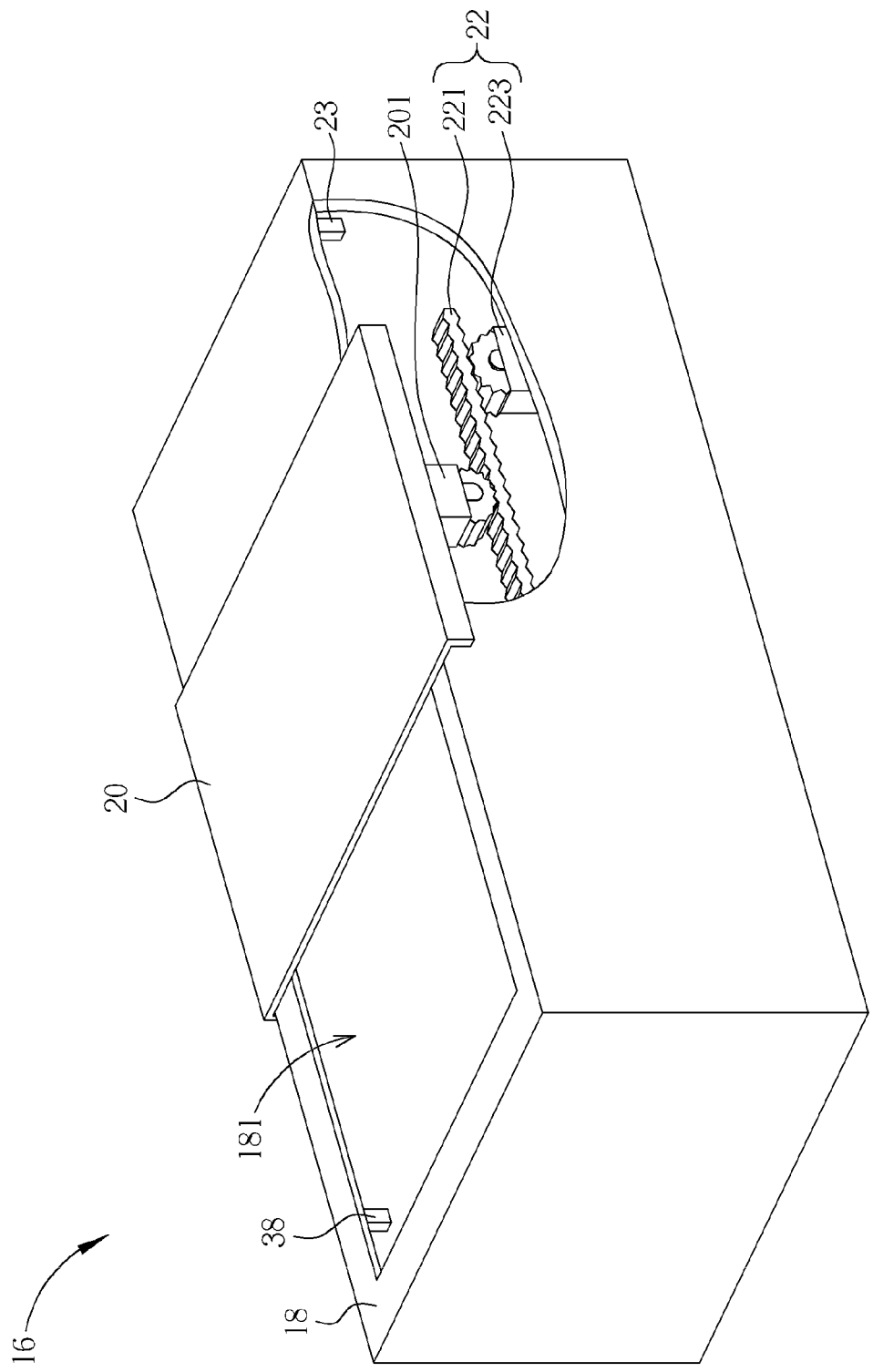
FIG. 5 is a diagram of the ventilation device according to a second embodiment of the present invention.

Please refer to FIG. 5. FIG. 5 is a diagram of the ventilation device 16 according to a second embodiment of the present invention. In this embodiment, elements having the same numerals as ones of the above-mentioned embodiment have the same structures and functions. As shown in FIG. 5, the ventilation device 16 is a sliding ventilation device, and the vane 20 is a sliding cover. The rack 221 of the driving unit 22 is engaged with the gear 201 on the vane 20. The stepping motor 223 of the driving unit 22 drives the rack 221 to drive the vane 20 to move relative to the opening 181, so as to enlarge or reduce the aperture between the vane 20 and the opening 181. The second positioning sensor 38 can be the optical sensor for detecting the position of the vane 20 with a beam so as to get the aperture between the vane 20 and the opening 181. In the second embodiment of the present invention, the first positioning sensor 23 and the second positioning sensor 38 are both for detecting the aperture between the vane 20 and the opening 181. Therefore, the first positioning sensor 23 and the second positioning sensor 38 can be disposed alternatively. Mechanism of the opening 181 and the vane 20 of the ventilation device 16 is not limited to the above-mentioned embodiment and depends on design demand.

In conclusion, the present invention sets the heat dissipating module 12 on the casing 28 of the computer system 10 for increasing heat dissipating efficiency. The control unit 26 of the heat dissipating module 12 can control the rotary speed of the fan 24 or control the driving unit 22 of the ventilation device 16 to drive the vane 20 to move relative to the opening 181 according to the command inputted by the input module 32 or the detecting result of the detecting component 14, so as to enlarge or reduce the aperture between the vane 20 and the opening 181. For example, when the user inputs the command to select the corresponding operating mode in the operating interface 341 on the display 34 by the input module 32, such as switching the heat dissipating module 12 into a manual mode, the operating interface 341 on the display 34 displays different detecting results of the detecting components 14 in different positions of the computer system 10, such as temperature of the electronic component 30 or the rotary speed of the fan 24 detected by the detecting components 14, so that the user can control the driving unit 22 to drive the vane 20 to move relative to the opening 181 or control the rotary speed of the fan 24 according to the detecting result of the detecting component 14. When the user considers the temperature of the electronic component 30 becomes abnormally high, the user can input the command by the input module 32 to control the control unit 26 to accelerate the rotary speed of the fan 24 and to control the driving unit 22 to drive the vane 20 to move relative to the opening 181, so as to enlarge the aperture between the vane 20 and the opening 181 for increasing the heat dissipating efficiency of the computer system 10. When the user considers the temperature of the electronic component 30 is lower than an average, the user can input the command by the input module 32 to control the control unit 26 to decelerate the rotary speed of the fan 24 and to control the driving unit 22 to drive the vane 20 to move relative to the opening 181, so as to reduce the aperture between the vane 20 and the opening 181 for economizing power consumption of the computer system 10 and for preventing dust from entering the casing 28.

In addition, when the user inputs the command to switch the heat dissipating module into an auto mode in the operating interface 341 on the display 34 by the input module 32, the control unit 26 of the heat dissipating module 12 can compare a datum detected by the detecting component 14 with a predetermined datum, and then controls the rotary speed of the fan 24 and controls the driving unit 22 to drive the vane 20 to move relative to the opening 181 according to the comparison result. For example, the datum detected by the detecting component 14 can be the temperature of the electronic component 30, the rotary speed of the fan 24, or the operating period of the electronic component 30. The detecting component 14 can further detect whether the specific application program is started. For instance, as the operating period of the electronic component 30 is longer or a number of the starting application programs is more than an allowance value, the temperature inside the casing 28 may increase extremely.

Therefore, as the datum detecting by the detecting component 14 is larger than the predetermined datum, the control unit 26 can accelerate the rotary speed of the fan 24 and control the driving unit 26 to drive the vane 20 to move relative to the opening 181 for enlarging the aperture between the vane 20 and the opening 181 automatically, so as to increase the heat dissipating efficiency of the computer system 10 effectively. On the other hand, when the datum detected by the detecting component 14 is smaller than the predetermined datum, the control unit 26 can decelerate the rotary speed of the fan 24 and control the driving unit 26 to drive the vane 20 to move relative to the opening for reducing the aperture between the vane 20 and the opening 181 automatically, so as to economize the power consumption of the computer system 10 and to prevent the dust from entering the casing 28. For example, when the detecting component 14 detects the computer system 10 executes the application programs, the control unit 26 compares the number of the executing application programs with the predetermined datum. When the number of the executing application programs is larger than the predetermined datum, the control unit 26 can control the driving unit 22 to drive the vane 20 to move relative to the opening 181 for enlarging the aperture between the vane 20 and the opening 181 and accelerating the rotary speed of the fan 24, so as to increase the heat dissipating efficiency of the computer system 10. When the number of the executing application programs is smaller than the predetermined datum, the control unit 26 can control the driving unit 22 to drive the vane 20 to move relative to the opening 181 for reducing the aperture between the vane 20 and the opening 181 and decelerating the rotary speed of the fan 24, so as to economize the power consumption of the computer system 10 and to prevent the dust from entering the casing 28.

Additionally when the heat dissipating module 12 is switched into the manual mode and the auto mode, the storage device 36 of the heat dissipating module 12 can automatically store the correlation between the detecting result of the detecting component 14 and the movement of the vane 20 driven by the driving unit 22, the correlation between the time and the movement of the vane 20 driven by the driving unit 22, the correlation between the time, the movement of the vane 20 driven by the driving unit 22, and the rotary speed of the fan 24, and so on. Thus, when the user inputs the command to switch the heat dissipating module 12 into a learning mode in the operating interface 341 on the display 34 by the input module 32, the control unit 26 controls the driving unit 22 to drive the vane 20 to move relative to the opening 181 or controls the rotary speed of the opening 181 according to the above-mentioned correlations. That is to say, the learn mode has functions of memorizing, imitating, studying, and so on. The control unit 26 can control the rotary speed of the fan 24 and the aperture between the vane 20 and the opening 181 according to the data stored in the storage device 36, so that the heat dissipating module 12 can provide the preferable heat dissipating efficiency. For example, situations of executing less application programs, lower rotary speed of the fan 24, and smaller aperture between the vane 20 and the opening 181 in the night represent the computer system 10 to generate less heat in the night, so that heat dissipating module 12 in the learn mode can decelerate the rotary speed of the fan 24 automatically in the night for lowering noise generated by the fan 24, and can control the driving unit 22 to drive the vane 20 to move relative to the opening 181 to reduce the aperture between the vane 20 and the opening 181 automatically in the night for preventing the dust from entering the casing 28.

Comparing to the prior art, the computer system of the present invention not only can adjust the rotary speed of the fan and the aperture manually, but also can record operating habits of the user, so as to adjust the rotary speed of the fan and the aperture automatically according to the records for optimizing the heat dissipating efficiency of the heat dissipating module. The computer system of the present invention can decrease numbers of the fan and a heat sink for economizing the cost, and can utilize the ventilation device to dissipate the heat generated by the electronic component out of the casing effectively, so as to decelerate the rotary speed of the fan for lowering the noise generated by the fan.

Those skilled in the art will readily observe that numerous modifications and alterations of the device and method may be made while retaining the teachings of the invention.

What is claimed is:

1. A heat dissipating module comprising:
   a detecting component;
   a ventilation device comprising:
      a housing whereon an opening is formed;
      at least one vane covering on the opening in a movable manner; and
      a driving unit electrically connected to the vane for driving the vane to move relative to the opening so as to adjust an aperture between the vane and the opening;
   a fan for inhaling or exhaling airflow through the opening of the ventilation device; and
   a control unit electrically connected to the detecting component, the ventilation device, and the fan for controlling the driving unit to drive the vane to move relative to the opening and controlling a rotary speed of the fan according to a detecting result of the detecting component, and the control unit being further for comparing a datum detected by the detecting component with a predetermined datum, for accelerating the rotary speed of the fan and for controlling the driving unit to drive the vane to move relative to the opening so as to enlarge the aperture between the vane and the opening when the datum detected by the detecting component is greater than the predetermined datum.

2. The heat dissipating module of claim 1, wherein the ventilation device further comprises a first sensor disposed on a side of the vane for sensing a position of the vane so as to get the aperture between the vane and the opening.

3. The heat dissipating module of claim 1, wherein the control unit is further for decelerating the rotary speed of the fan and for controlling the driving unit to drive the vane to move relative to the opening so as to reduce the aperture between the vane and the opening when the datum detected by the detecting component is smaller than the predetermined datum.

4. The heat dissipating module of claim 1 further comprising:
   a storage device electrically connected to the control unit for storing a correlation between the detecting result of the detecting component and a movement of the vane driven by the driving unit and storing a correlation between time and the movement of the vane driven by the driving unit so that the control unit controls the driving unit to drive the vane to move relative to the opening according to the correlations.

5. The heat dissipating module of claim 4, wherein the storage device is further for storing a correlation between the time, the movement of the vane driven by the driving unit, and the rotary speed of the fan, so that the control unit controls the driving unit to drive the vane to move relative to the opening and controls the rotary speed of the vane according to the correlations.

6. The heat dissipating module of claim 1, wherein the driving unit comprises:
   a rack engaged with a gear disposed on the vane; and
   a stepping motor for driving the rack so as to drive the vane to move relative to the opening.

7. The heat dissipating module of claim 6, wherein the ventilation device further comprises:
a plurality of vanes, the driving unit further comprising a link connected to the plurality of vanes so that the vanes are moved relative to the opening when one of the vanes is driven; and
a second sensor disposed on an end of the link for sensing a position of the link so as to get the aperture between the vane and the opening.

8. A computer system comprising:
a casing;
an electronic component disposed inside the casing;
an input module for inputting a command; and
a heat dissipating module disposed on the casing for dissipating heat generated by the electronic component, the heat dissipating module comprising:
a detecting component;
a ventilation device comprising:
a housing whereon an opening is formed;
at least one vane covering on the opening in a movable manner; and
a driving unit electrically connected to the vane for driving the vane to move relative to the opening so as to adjust an aperture between the vane and the opening;
a fan for inhaling or exhaling airflow through the opening of the ventilation device; and
a control unit electrically connected to the input module, the detecting component, the ventilation device, and the fan for controlling the driving unit to drive the vane to move relative to the opening according to the command from the input module or a detecting result of the detecting component, the input module being for inputting the command to control the control unit to compare a datum detected by the detecting component with a predetermined datum, and the control unit being further for accelerating a rotary speed of the fan and for controlling the driving unit to drive the vane to move relative to the opening so as to enlarge the aperture between the vane and the opening when the datum detected by the detecting component is greater than the predetermined datum.

9. The computer system of claim 8 further comprising:
a display electrically connected to the control unit of the heat dissipating module for displaying an operating interface corresponding to the command from the input module or the detecting result of the detecting component.

10. The computer system of claim 8, wherein the ventilation device further comprises a first sensor disposed on a side of the vane for sensing a position of the vane so as to adjust the aperture between the vane and the opening.

11. The computer system of claim 8, wherein the control unit is further for decelerating the rotary speed of the fan and for controlling the driving unit to drive the vane to move relative to the opening so as to reduce the aperture between the vane and the opening when the datum detected by the detecting component is smaller than the predetermined datum.

12. The computer system of claim 8, wherein the input module is for inputting the command to control the control unit to control a rotary speed of the fan according to the detecting result of the detecting component.

13. The computer system of claim 8, wherein the heat dissipating module further comprises a storage device electrically connected to the control unit for storing a correlation between the detecting result of the detecting component and a movement of the vane driven by the driving unit and a correlation between time and the movement of the vane driven by the driving unit, and the input module is for inputting the command to control the control unit to control the driving unit to drive the vane to move relative to the opening according to the correlations.

14. The computer system of claim 13, wherein the storage device is further for storing a correlation between the time, the movement of the vane driven by the driving unit, and a rotary speed of the fan, so that the input module is for inputting the command to control the control unit to control the driving unit to drive the vane to move relative to the opening and to control the rotary speed of the vane according to the correlations.

15. The computer system of claim 8, wherein the driving unit comprises:
a rack engaged with a gear disposed on the vane; and
a stepping motor for driving the rack so as to drive the vane to move relative to the opening.

16. The computer system of claim 15, wherein the ventilation device further comprises:
a plurality of vanes, the driving unit further comprising a link connected to the plurality of vanes so that the vanes are moved relative to the opening when one of the vanes is driven; and
a second sensor disposed on an end of the link for sensing a position of the link so as to get the aperture between the vane and the opening.

17. A heat dissipating module comprising:
a detecting component;
a ventilation device comprising:
a housing whereon an opening is formed;
at least one vane covering on the opening in a movable manner; and
a driving unit electrically connected to the vane for driving the vane to move relative to the opening so as to adjust an aperture between the vane and the opening;
a fan for inhaling or exhaling airflow through the opening of the ventilation device;
a control unit electrically connected to the detecting component, the ventilation device, and the fan for controlling the driving unit to drive the vane to move relative to the opening and controlling a rotary speed of the fan according to a detecting result of the detecting component; and
a storage device electrically connected to the control unit for storing a correlation between the detecting result of the detecting component and a movement of the vane driven by the driving unit and for storing a correlation between time and the movement of the vane driven by the driving unit so that the control unit controls the driving unit to drive the vane to move relative to the opening according to the correlations, and the storage device being further for storing a correlation between the time, the movement of the vane driven by the driving unit, and the rotary speed of the fan, so that the control unit controls the driving unit to drive the vane to move relative to the opening and controls the rotary speed of the vane according to the correlation.

* * * * *